(12) United States Patent
Kirby et al.

(10) Patent No.: US 10,145,252 B2
(45) Date of Patent: Dec. 4, 2018

(54) ABRADABLE COMPOSITIONS AND METHODS FOR CMC SHROUDS

(71) Applicant: General Electric Company, Schenectady, NY (US)

(72) Inventors: Glen Harold Kirby, Liberty Township, OH (US); Paul Stephen Manicke, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 461 days.

(21) Appl. No.: 14/963,448

(22) Filed: Dec. 9, 2015

(65) Prior Publication Data

US 2017/0167279 A1 Jun. 15, 2017

(51) Int. Cl.
*C04B 41/50* (2006.01)
*F01D 9/04* (2006.01)
(Continued)

(52) U.S. Cl.
CPC .............. *F01D 9/04* (2013.01); *C04B 35/495* (2013.01); *C04B 35/565* (2013.01);
(Continued)

(58) Field of Classification Search
CPC .......... F01D 9/04; F01D 11/001; F01D 5/288; F01D 11/122; C04B 35/495;
(Continued)

(56) References Cited

U.S. PATENT DOCUMENTS 5,705,231 A * 1/1998 Nissley ................ C23C 4/02
427/419.3
8,658,255 B2 2/2014 Kirby et al.
(Continued)

FOREIGN PATENT DOCUMENTS

| EP | 1 798 311 A2 | 6/2007 |
| EP | 2 192 098 A2 | 6/2010 |
| WO | 2015/183439 A2 | 12/2015 |

OTHER PUBLICATIONS

Blasse. G., "Crystal Structure and Fluorescence of Compounds Ln2Me4+Me6+08," Journal of Inorganic and Nuclear Chemistry, vol. 30, pp. 2091-2099 (Jan. 1, 1968).
(Continued)

*Primary Examiner* — Jonathan C Langman
(74) *Attorney, Agent, or Firm* — General Electric Company; William Andes (57) ABSTRACT

Coating systems on a surface of a CMC component, such as a CMC shroud, are provided. The coating system can include an environmental barrier coating on the surface of the CMC component and an abradable coating on the environmental barrier coating and defining an external surface opposite of the environmental barrier coating. The abradable coating includes a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, or a combination thereof; and B comprises Mo, W, or a combination thereof. In one embodiment, the abradable coating has a first coefficient of thermal expansion at an interface with the environmental barrier coating that changes to a second coefficient of thermal expansion at its external surface. Methods are also provided for applying an abradable coating onto a CMC component.

20 Claims, 5 Drawing Sheets

(51) Int. Cl.
*C04B 41/89* (2006.01)
*C04B 35/495* (2006.01)
*C04B 35/565* (2006.01)
*C04B 35/80* (2006.01)
*C04B 41/00* (2006.01)
*C04B 41/52* (2006.01)
*F01D 11/00* (2006.01)
*F01D 5/28* (2006.01)
*C04B 111/00* (2006.01)
*F01D 11/12* (2006.01)

(52) U.S. Cl.
CPC .......... *C04B 35/806* (2013.01); *C04B 41/009* (2013.01); *C04B 41/5072* (2013.01); *C04B 41/52* (2013.01); *C04B 41/89* (2013.01); *F01D 11/001* (2013.01); *C04B 2111/00405* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3287* (2013.01); *C04B 2235/3418* (2013.01); *F01D 5/288* (2013.01); *F01D 11/122* (2013.01); *F05D 2220/32* (2013.01); *F05D 2230/90* (2013.01); *F05D 2300/13* (2013.01); *F05D 2300/131* (2013.01); *F05D 2300/15* (2013.01); *F05D 2300/17* (2013.01); *F05D 2300/6033* (2013.01); *F05D 2300/611* (2013.01)

(58) Field of Classification Search
CPC . C04B 41/5072; C04B 35/565; C04B 35/806; C04B 41/009; C04B 41/52; C04B 41/89; C04B 2111/00405; C04B 2235/3224; C04B 2235/3225; C04B 2235/3227; C04B 2235/3229; C04B 2235/3232; C04B 2235/3287; C04B 2235/3418; F05D 2220/32; F05D 2230/90; F05D 2300/13; F05D 2300/131; F05D 2300/15; F05D 2300/17; F05D 2300/6033; F05D 2300/611

See application file for complete search history.

(56) References Cited

U.S. PATENT DOCUMENTS

2009/0075057 A1* 3/2009 Kulkarni ................. C23C 4/02
428/323
2013/0089673 A1 4/2013 Kirby et al.
2013/0089720 A1 4/2013 Kirby et al.

OTHER PUBLICATIONS

Extended European Search Report and Opinion issued in connection with corresponding EP Application No. 16202472.3 dated May 9, 2017.
Co-pending U.S. Appl. No. 15/033,646, filed Jun. 2, 2015.
First Office Action and Search issued in connection with corresponding CN Application No. 201611130983.6 dated Apr. 16, 2018.

* cited by examiner

ABRADABLE COMPOSITIONS AND METHODS FOR CMC SHROUDS

FIELD OF THE INVENTION

Embodiments of the present invention generally relate to thermal and environmental barrier coatings for ceramic components, particularly for use on a CMC shroud in a gas turbine engine.

BACKGROUND OF THE INVENTION

The turbine section of a gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding hot compressed gas produced by combustion of a fuel. Gas turbine buckets or blades generally have an airfoil shape designed to convert the thermal and kinetic energy of the flow path gases into mechanical rotation of the rotor.

Within a turbine engine, a shroud is a ring of material surrounding the rotating blades. Turbine performance and efficiency may be enhanced by reducing the space between the tip of the rotating blade and the stationary shroud to limit the flow of air over or around the top of the blade that would otherwise bypass the blade. For example, a blade may be configured so that its tip fits close to the shroud during engine operation. Thus, generating and maintaining an efficient tip clearance is particularly desired for efficiency purposes.

During engine operation, the blade tips can sometime rub against the shroud, thereby increasing the gap and resulting in a loss of efficiency, or in some cases, damaging or destroying the blade set. For CMC shrouds, damage to a metal blade is even more likely, since the silicon carbide material is significantly harder than the Nickel-based superalloys. For a CMC shroud, and Environmental Barrier Coating is also required for successful performance/survival of a the part due to material loss from high temperature steam recession. Thus, if rub from a blade tip takes off the coating, the CMC shroud is left susceptible to high temperature steam recession.

In order to reduce the risk of coating loss, an abradable layer is deposited on top of the EBC to protect it from blade rub. Generally, the abradable layer is a series of ceramic ridges that break away upon contact with a rotating blade tip. The ceramic material is typically made out of the same ceramic material as one of the environmental barrier layers, for example, rare earth disilicate or barium strontium aluminosilicate (BSAS).

The patterned ridges on the surface of the shroud, however, lead to aerodynamic losses to the efficiency of the engine. Additionally, it is difficult to produce a thick, continuous layer of the EBC materials (>20 mils) without spallation. Furthermore, a continuous ceramic layer is typically quite hard, and does not abrade but rather damages the rotating blades.

Thus, an improved abradable coating for a CMC component, particularly a shroud, is desirable in the art.

BRIEF DESCRIPTION OF THE INVENTION

Aspects and advantages of the invention will be set forth in part in the following description, or may be obvious from the description, or may be learned through practice of the invention.

Coating systems are generally provided on a surface of a CMC component. In one embodiment, the coating system includes an environmental barrier coating on the surface of the CMC component and an abradable coating on the environmental barrier coating and defining an external surface opposite of the environmental barrier coating. The abradable coating includes a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, or a combination thereof; and B comprises Mo, W, or a combination thereof. In one embodiment, the abradable coating has a first coefficient of thermal expansion at an interface with the environmental barrier coating that changes to a second coefficient of thermal expansion at its external surface.

For example, the coating system can be included on a hot gas path surface of a CMC shroud in a gas turbine engine.

Methods are also generally provided for applying an abradable coating onto a CMC shroud of a gas turbine engine. In one embodiment, an abradable coating is applied on an environmental barrier coating of a hot gas path surface of the CMC shroud, with the abradable coating comprises a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, or a combination thereof; and B comprises Mo, W, or a combination thereof. In one embodiment, the abradable coating has a coefficient of thermal expansion that changes over a gradient from the environmental barrier coating to the external surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof. In particular embodiments, Ln is selected from the group consisting of neodymium, gadolinium, erbium, yttrium, and mixtures thereof.

A coating for a CMC shroud is generally provided herein, along with its methods of formation. The coating for the CMC shroud is relatively thick, dense, and mechanically resistant to spall and rub in turbine engine environments. The thick, sacrificial coating is generally provided in combination with a plurality of other, thinner layers to form an EBC on a CMC substrate. When applied to a shroud surface, the sacrificial coating provides thickness that can rub away upon contact of a blade tip with the shroud. Thus, the sacrifice of this sacrificial coating during rub events serves to protect the underlying layers of the EBC, such as a relatively thin underlayer of bond coat that in turn protects the CMC from oxidation and/or a relatively thin underlayer of rare earth disilicate that in turn protects the CMC from high temperature steam penetration. It should also be noted that the sacrificial coating itself, may also provide some protection against high temperature steam penetration.

Figure 1:
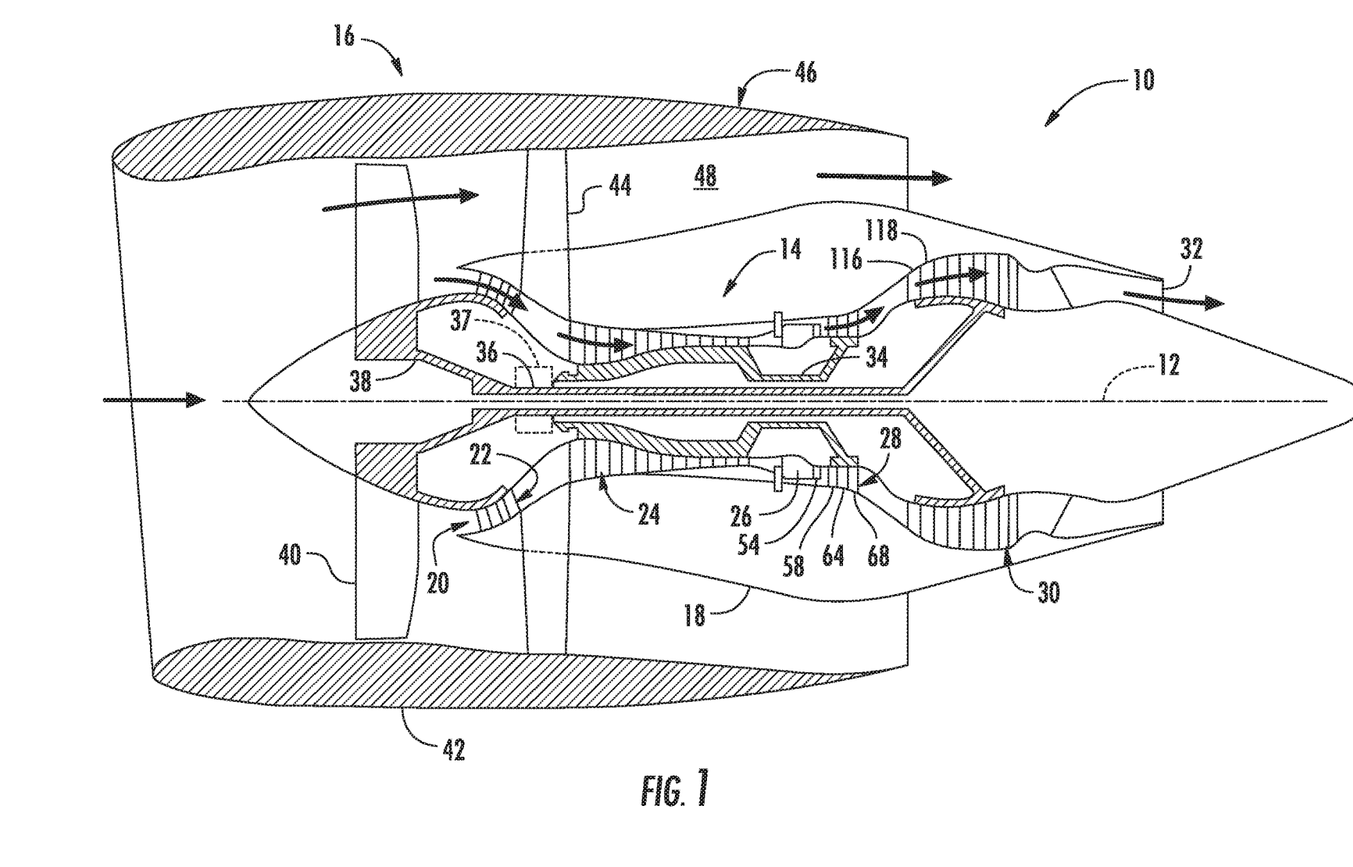
FIG. 1 is a schematic cross-sectional view of a gas turbine engine in accordance with one embodiment of the present disclosure.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

Figure 2:
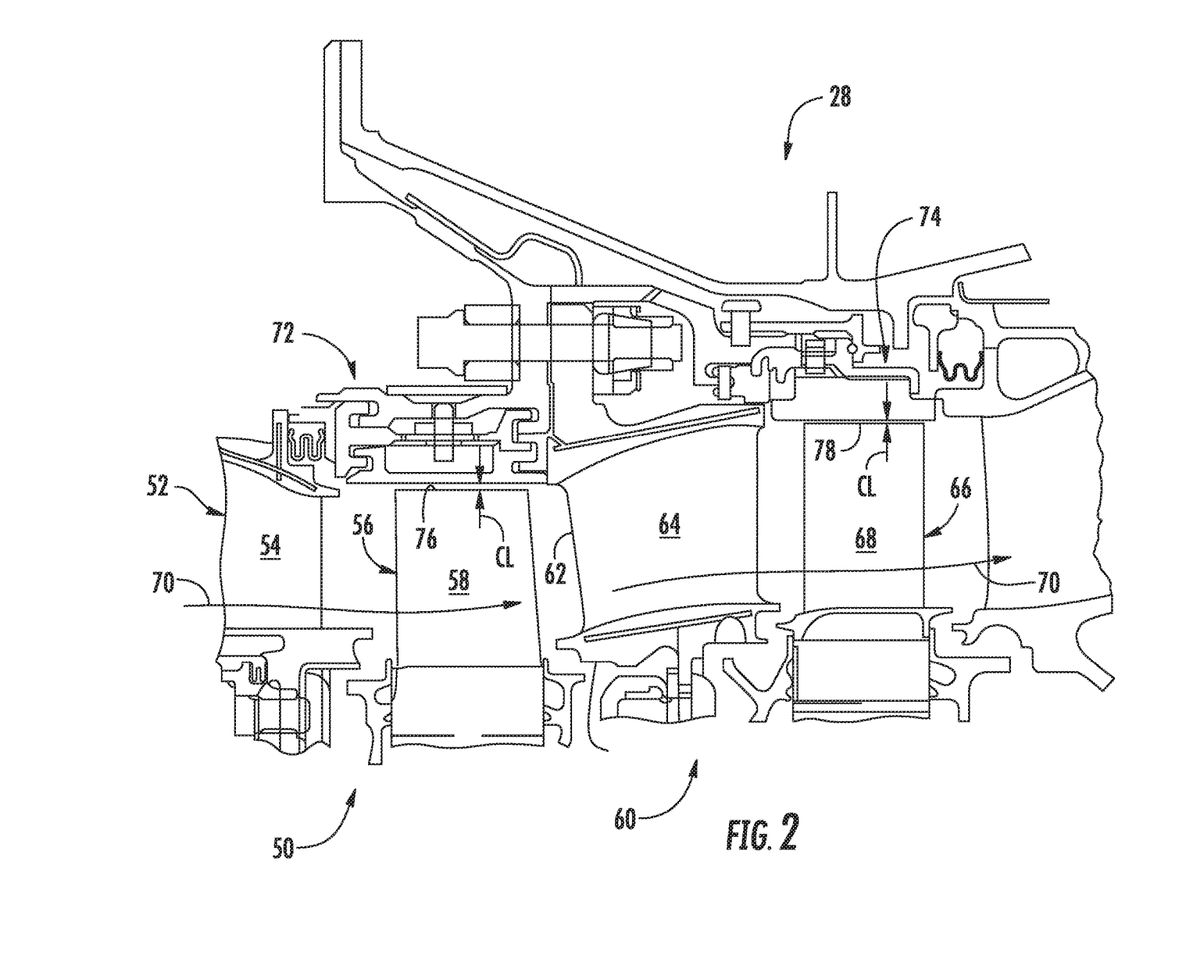
FIG. 2 is an enlarged cross sectional side view of a high pressure turbine portion of a gas turbine engine in accordance with one embodiment of the present disclosure.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines, and rather may be utilized in any suitable section of a gas turbine engine.

Figure 3:
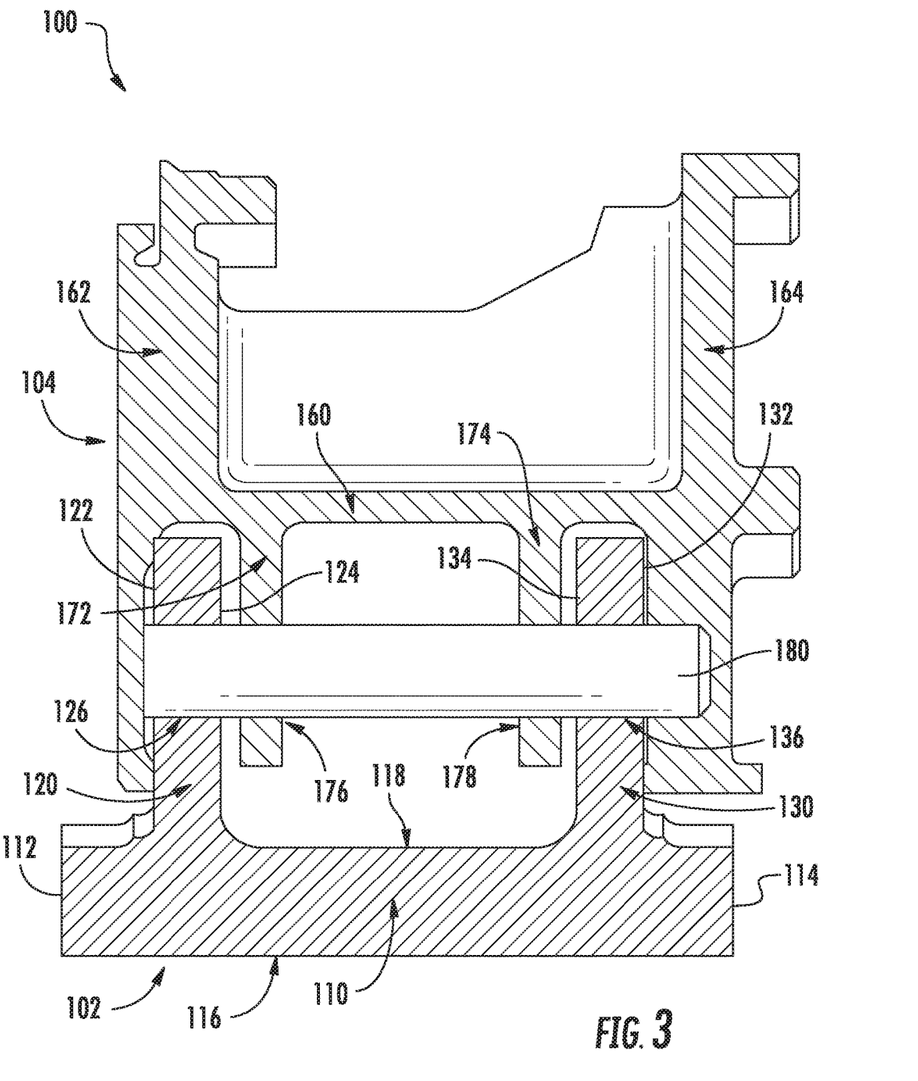
FIG. 3 is a cross-sectional view of a shroud assembly in accordance with one embodiment of the present disclosure.

Referring now to FIG. 3, a shroud assembly 100 and shroud 102 therefor are disclosed. Shroud assemblies 100 as disclosed herein may be utilized in place of shroud assemblies 72, 74, as discussed above, or any other suitable shroud assemblies in an engine 10. Similarly, shrouds 102 as disclosed herein may be utilized in place of shrouds 76, 78, as discussed above, or any other suitable shrouds in an engine 10.

Shrouds 102 and shroud assemblies 100 in accordance with the present disclosure provide a number of advantages. In particular, shrouds 102 in accordance with the present disclosure are "open"-style shrouds which have improved structural rigidity. Shroud designs in accordance with the present disclosure are particularly advantageous when the shrouds are formed from ceramic matric composite ("CMC") materials.

FIG. 3 illustrates a shroud assembly 100, which includes a shroud 102 and a hanger 104 in accordance with the present disclosure. A shroud 102 in accordance with the present disclosure may include, for example, a shroud body 110, a forward flange 120, and a rear flange 130. In exemplary embodiments, the shroud body 110 and flanges 120, 130 (and shroud 102 in general) may be formed from a CMC material, although in alternative embodiments the shroud body 110 and flanges 120, 130 (and shroud 102 in general) may be formed from another suitable material such as a metal, etc. In particular, in exemplary embodiments, shroud body 110 and flanges 120, 130 may be integral and thus generally formed as a single component.

Shroud body 110 may include a forward surface 112 and a rear surface 114. The rear surface 114 is axially spaced from the forward surface 112, such as generally along the centerline 12 when in the engine 10. An inner surface 116 and an outer surface 118 may each extend between the forward surface 112 and the rear surface 114. The outer surface 118 is radially spaced from the inner surface 116. Inner surface 116 may, when the shroud 102 is in engine 10, be exposed to the hot gas path 70, while outer surface 118 is thus radially spaced from the hot gas path 70.

Forward flange 120 and rear flange 130 may each extend from the shroud body 110, such as from the outer surface 118 thereof. Rear flange 130 may be axially spaced from forward flange 120. Further, forward flange 120 may be generally positioned proximate the forward surface 112 of the body 110, while rear flange 130 is generally positioned proximate the rear surface 114 of the body 110. Each flange 120, 130 may include a forward surface 122, 132 (respectively) and a rear surface 124, 134 respectively. As shown, the flanges 120, 130 may each extend generally circumferentially along their lengths, and thus be circumferentially oriented.

Further, one or more bore holes 126, 136 may be defined in each flange 120, 130, respectively. Each bore hole 126, 136 may, for example, extend generally axially through the associated flange 120, 130 between the associated forward surface 122, 132 and associated rear surface 124, 134. The bore holes 126, 136 are generally utilized for coupling the shroud 102 to the hanger 104. For example, pins may be inserted into the bore holes 126, 136 and associated bore holes of the hanger 104 to couple the shroud 102 to the hanger 104.

Referring briefly to FIG. 3, an exemplary hanger 104 is illustrated. Hanger 104 generally is coupled to and supports the shroud 102 in the engine 10, and is itself supported by various other components in the engine 10. Hanger 104 may include a hanger body 160, and a forward hanger arm 162 and rear hanger arm 164 extending from the hanger body 160, such as radially outward (away from hot gas path 70) from the hanger body 160. Hanger body 160 may thus extend between the arms 162, 164. The rear arm 164 may be axially spaced from the forward arm 162, as shown.

Hanger 104 may further include one or more flanges extending from the hanger body 1650, such as radially inward (towards hot gas path 70) from the hanger body 160. For example, a forward flange 172 and a rear flange 174 may extend from the hanger body 160. Rear flange 174 may be axially spaced from forward flange 172. Forward flange 172 may be proximate forward hanger arm 162 and rear flange 174 may be proximate rear hanger arm 164. One or more bore holes 176, 178 may be defined in the flanges 172, 174, respectively.

When assembled, the bore holes 126, 136 of the shroud flanges 120, 130 may generally align with the associated hanger bore holes 176, 178. For example, bore holes 126 may align with bore holes 176, and bore holes 136 may align with bore holes 178. One or more pins 180 may be inserted through and thus extend through the associated bore holes to couple the hanger 104 and shroud 102 together. In some embodiments as shown, a pin 180 may extend through aligned bore holes 126, 176, 136 and 178. Alternatively, separate pins may be utilized for aligned bore holes 126, 176 and aligned bore holes 136, 178.

Figure 4:
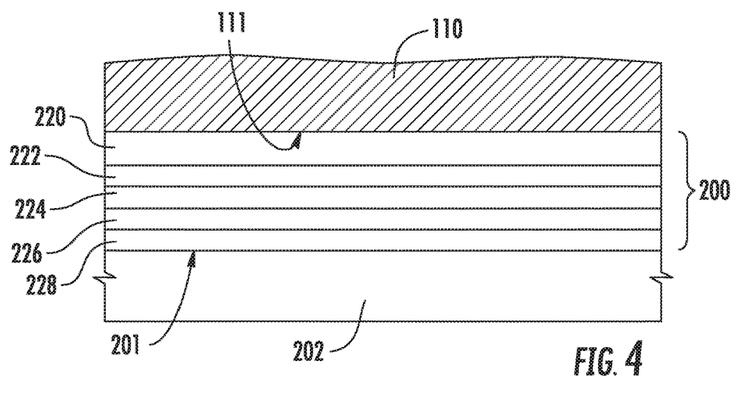
FIG. 4 is a schematic cross sectional view of an exemplary coated substrate in accordance with one embodiment disclosed herein.
Figure 5:
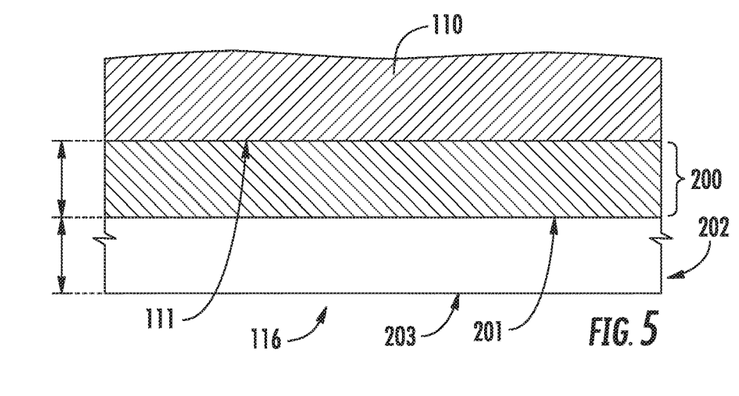
FIG. 5 is a schematic cross sectional view of another exemplary coated substrate in accordance with one embodiment disclosed herein.
Figure 6:
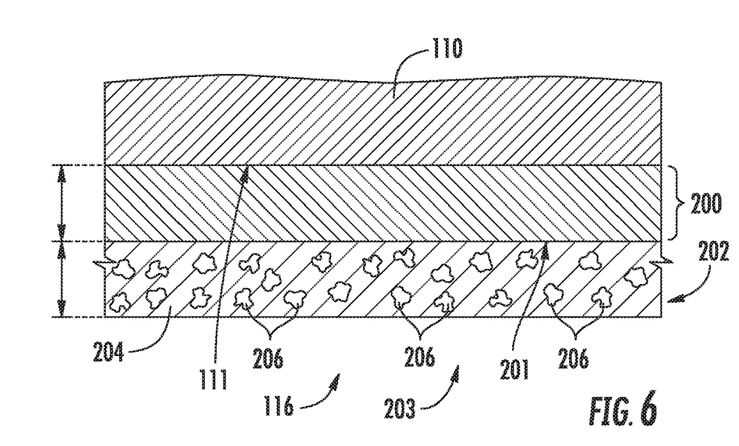
FIG. 6 is a schematic cross sectional view of yet another exemplary coated substrate in accordance with one embodiment disclosed herein.

FIGS. 4, 5, and 6 show close-up cross-sectional views of embodiments of the inner surface 116 of the shroud body 110 having an environmental barrier coating (EBC) 200 and an abradable coating 202 thereon. As shown, the EBC 200 is positioned between the surface 111 of the inner surface 116 and the abradable coating 202. The abradable coating 202 is relatively thick, dense, and mechanically resistant to spall and rub in turbine engine environments, so as to serve as a thick, sacrificial coating protecting the underlying EBC 200 and the CMC substrate 110.

In one embodiment, the EBC 200 generally includes a plurality of layers, such as a bond coat layer, one or more hermetic layers, one or more transition layers, an outer coating layer, etc. Referring to FIG. 4, an exemplary EBC 200 is shown between the CMC shroud 110 and the abradable coating 202. In the exemplary embodiment shown, a bond coat 220 is positioned on the surface 111 of the CMC shroud 110 (e.g., having a thickness of about 1 µm to about 2600 µm). The bond coat 220 can be a silicon layer positioned directly on the surface 111 of the CMC shroud 110. A first rare earth silicate coating 222 is on the bond coat 220

(e.g., having a thickness of about 1 μm to about 2600 μm) and can be formed from at least one rare earth silicate layer (e.g., a rare earth disilicate). An optional transition coating 224 (e.g., comprising barium-strontium-aluminum silicate (BSAS)) is shown within the EBC 200 (e.g., having a thickness of about 1 μm to about 2600 μm), along with an optional second hermetic layer 226 (e.g., having a thickness of about 1 μm to about 2600 μm and/or comprising a rare earth disilicate). An optional outer coating 226 (e.g., comprising a rare earth monosilicate) is also shown within the EBC 200 (e.g., having a thickness of about 1 μm to about 130 μm).

As stated, the bond coat 220 is positioned in the CMC shroud 110, and in most embodiments is in direct contact with the surface 111. The bond coating generally provides oxidation protection to the underlying CMC shroud 110. In one particular embodiment, the bond coat 26 is a silicon bond coat. The bond coat will oxidize in service (after use) to form a silicon oxide layer positioned between the bond coat and the first rare earth silicate coating.

The first rare earth silicate coating 222 generally provides hermeticity against high temperature steam. In one embodiment, the first rare earth silicate coating 222 is formed from at least one layer of a slurry-deposited yttrium ytterbium disilicate (YbYDS) layer and may be doped as desired. In another embodiment, the first rare earth silicate coating 222 is formed from at least one layer of air plasma sprayed yttrium ytterbium disilicate (YbYDS). Other silicate layers can be present in the first rare earth silicate coating 220 in order to provide hermeticity against high temperature steam, such as YbDS, LuDS, TmDS, LuYDS, TmYDS, etc. (where Lu=Lutetium and Tm=Thulium), although any rare earth disilicate can be utilized.

Transition layer 224 is optional, and can include barium strontium aluminosilicate (BSAS) materials, such as having a range of BaO, SrO, $Al_2O_3$, and/or $SiO_2$ compositions.

The second rare earth silicate coating 226 also provides hermeticity against high temperature steam. In one embodiment, the second rare earth silicate coating 226 is formed from at least one layer of a slurry-deposited yttrium ytterbium disilicate (YbYDS) layer and may be doped as desired. In another embodiment, the second rare earth silicate coating 226 is formed from at least one layer of air plasma sprayed yttrium ytterbium disilicate (YbYDS). Other silicate layers can be present in the second rare earth silicate coating 226, similar to those described above with respect to the first rare earth silicate coating 222 in order to provide hermeticity against high temperature steam. In one particular embodiment, the first rare earth silicate coating 222 and the second rare earth silicate coating 226 are substantially identical in terms of composition.

Both the first rare earth silicate coating 222 and the second rare earth silicate coating 226 can be formed via slurry deposition. In another embodiment, both the first rare earth silicate coating 222 and the second rare earth silicate coating 226 can be formed via air plasma spray processing.

Finally, an outer layer 228 is positioned on the second rare earth silicate coating 226. In one embodiment, the outer layer 228 comprises at least one slurry-deposited yttrium monosilicate (YMS) layer and may be doped as desired. In another embodiment, the outer layer 228 is formed from at least one layer of air plasma sprayed yttrium monosilicate (YMS). The outer layer 228 provides protection against steam recession and molten dust. Materials other than rare earth silicates can be utilized within the outer coating, such as rare earth hafnates, rare earth zirconates, rare earth gallates (e.g., monoclinic type, such as $Ln_4Ga_2O_9$), rare earth monotitanate (e.g., $Ln_2TiO_5$), rare earth cerate (e.g., $Ln_2CeO_5$), rare earth germinate (e.g., $Ln_2GeO_5$), or mixtures thereof. However, all of these materials have a relatively high coefficient of thermal expansion (CTE) compared to rare earth silicate. Thus, rare earth monosilicate is preferred. Hafnia, rare-earth stabilized hafnia, and rare-earth stabilized zirconia provide protection against steam recession but not CMAS, and also have higher CTE than rare earth monosilicate.

As shown in FIGS. 4, 5, and 6, the abradable coating 202 is positioned on the outer surface 201 of the EBC 200 so as to protect the underlining EBC 200 from rub events. The thickness of the abradable coating 202 can vary depending on the particular use of the component. In one embodiment, the abradable coating 202 is deposited to a thickness of 1 micrometer to 2540 micrometers (100 mils). In one embodiment, the abradable coating is typically deposited much thicker than the each of the underlying EBC layers. The abradable could be deposited thicker than 2540 micrometers, if desired, as it is not a thermal expansion mismatch the drives the thickness.

The abradable coating 202 comprises a compound of the formula: $Ln_2ABO_8$, where Ln comprises a rare earth element or a mixture of rare earth elements; A comprises Si, Ti, Ge, or a combination thereof; and B comprises Mo, W, or a combination thereof. As stated above, "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof. In particular embodiments, Ln is selected from the group consisting of neodymium, gadolinium, erbium, yttrium, and mixtures thereof.

In one embodiment, B comprises Mo. In certain embodiments, B comprises a combination of Mo and W. For instance, the compound can have the formula $Ln_2AMo_xW_{1-x}O_8$, where 0≤x≤about 0.5 (e.g., about 0.1≤x≤about 0.5).

While compounds of the formula $Ln_2ABO_8$ exhibit high stability in high temperature steam such as found in a hot gas path of a gas turbine, the most unstable element in the compound is on the B site (i.e., Mo and/or W). However, even if some Mo or W volatilizes, the result may be a $Ln_2AO_5$ compound on the surface that is also very resistant to high temperature steam recession. Thus, in one embodiment, the material at the Ln site can be chosen to such that a mixture of oxyapetite phase and $Ln_2AO_5$ phase forms on the surface of the coating. This reaction seals the material from deep penetration of the molten aluminosilicate into the EBC system. Also, the presence of the $Ln_2AO_5$ component in the $Ln_2ABO_8$ molten aluminosilicate reaction layer improves adhesion since the $Ln_2AO_5$ has a lower thermal expansion than the oxyapatite; resulting in a net thermal expansion that is closer to the thermal expansion of the substrate. Furthermore, both the $Ln_2AO_5$ and oxyapatite phases that result from reaction between molten aluminosilicate and a layer including $Ln_2ABO_8$ are resistant to high temperature steam recession.

While A can be any of Si, Ti, Ge, or a combination thereof, in one particular embodiment, A includes Si, either alone or in combination with Ti and/or Ge. For example, the compound can have the formula: $Ln_2Si_yA_{1-y}Mo_xW_{1-x}O_8$, where 0≤x≤about 0.5; 0<y≤about 0.5; and A is Ti, Ge, or a combination thereof.

In the embodiment shown in FIG. 4, the abradable coating 202 can have a single phase structure (e.g., a zircon crystal structure or a scheelite crystal structure) with less than about 10% by volume of a secondary crystal phase. In this embodiment, the abradable coating 202 is generally described as a continuous, dense layer forming the external, exposed surface of any type of TBC or EBC system on a substrate with a porosity of less than about 15%. In other embodiments, the abradable layer 26 may include a continuous porous layer (e.g., greater than about 15% porosity) and/or a pattern of dense (e.g., less than about 15% porosity) abradable ridges. The abradable coating can be formed from a single layer or from multiple layers.

The selection of the components in the compound for use in the coating can generally be selected to ensure the single phase crystal structure (e.g., zircon structure or scheelite structure) and to match closely the coefficient of thermal expansion ("CTE") of the EBC's outer layer 228 and/or the underlying CMC surface 111. CTE matching (or a near match) can enable the formation and operation of a dense, crack free coating layer on the EBC's surface 201. For example, if the substrate is a CMC that includes silicon carbide, then a coating that includes the compound having the formula: $Y_2SiMo_xW_{1-x}O_8$ (where x is 0 to about 0.5, such as $Y_2SiWO_8$) can be particularly suitable due to the close CTEs of SiC and $Y_2SiMoO_8$. Thus, a preferred embodiment of the compound can have the formula: $Ln_2Si_yA_{1-y}Mo_xW_{1-x}O_8$, where 0≤x≤about 0.5; 0≤y≤about 0.5; and A is Ti, Ge, Sn, Ce, Hf, Zr, or a combination thereof, especially when the compound has a zircon crystal structure. In certain embodiments when B includes tungsten (W), compounds having a particularly suitable coefficient of thermal expansion include $Sm_2SiMo_xW_{1-x}O_8$ (where x is 0 to about 0.5, such as $Sm_2SiWO_8$), $Gd_2SiMo_xW_{1-x}O_8$ (where x is 0 to about 0.5, such as $Gd_2SiWO_8$), and combinations thereof.

Many of the other compounds of the $Ln_2ABO_8$ have a scheelite structure that may have a thermal expansion nearly equivalent to a SiC CMC or a higher thermal expansion than a SiC CMC. If higher than a SiC, however, vertically cracked layers comprised of the scheelite formed of these materials can still offer some abradability. In addition, the compounds of the formula $Ln_2ABO_8$ (either with zircon or scheelite structure) can offer additional protection from molten aluminosilicates, particularly those comprising dirt or sand. That is, the coating is resistant to molten aluminosilicates themselves, such that the coating layer remains hermetic despite reaction with molten aluminosilicates.

Without wishing to be bound by any particular theory, it is believed that the CTE of the $Ln_2ABO_8$ compound can be controlled by altering the size of the element(s) represented by "A" in the formula. That is, through intentional use of Si, Ti, Ge, or a combination thereof in the $Ln_2ABO_8$ compound, the CTE of the resulting coating can be controlled. More particularly, it is believed that increasing the ionic size of the element(s) at position represented by "A" in the formula can lead to an increased CTE in the coating.

Referring to FIG. 6, the abradable coating 202 is shown having a discontinuous, secondary phase 206 defined within a matrix material 204. In one embodiment, the discontinuous, secondary phase is formed from the compound having the formula: $Ln_2ABO_8$ described above. The matrix material can be formed of an abradable material, a rare earth silicate (e.g., a rare earth disilicate, a rare earth monosilicate, or a combination thereof), etc. or combinations thereof. In one particular embodiment, the matrix material 204 is formed from a rare earth disilicate is the continuous matrix, with or without a rare earth monosilicate mixed within the continuous phase.

The embodiments of FIGS. 4-6 show that the abradable coating 202 defines an external surface of the shroud component. As such, the abradable coating 202 can be receive the impact of any blade strike, while protecting the underlying EBC layers.

Any suitable method can be utilized to apply the abradable coating 202 onto the EBC, including a slurry process, a spray deposition process, an additive manufacturing (i.e., 3D printing by building by layers), etc., followed by heat treatment to merge the as-deposited layers into a single layer. In one embodiment, the abradable coating 202 is formed in a manner that forms a graded composition, abradability, and/or porosity within the abradable coating 202. For example, the abradable coating 202 can have a relatively low CTE near the underlying EBC, but be graded to a higher CTE near the exposed surface. In addition or alternatively, the abradable coating 202 can have a relatively low abradability near the underlying EBC, but be graded to a higher abradability near the exposed surface. As such, the abradable coating 202 can be more giving in a rub event at the exposed surface, while being stronger closer to the underlying EBC.

In one embodiment, the abradable coating 202 is graded compositionally to control the properties of the layer at particular depths through the thickness, as opposed to or in addition to having a graded density/porosity. For example, the particular elements included in the general compound $Ln_2ABO_8$ can be compositionally graded to adjust the CTE and/or abradability. In one embodiment, a composition having a CTE closest to the material of the underlying surface can be utilized and changed to a different CTE (e.g., a higher CTE) as it extends away from the underlying material.

In one embodiment, the composition of the Ln component can be different (e.g., graded) at particular thicknesses within the abradable coating 202. For example, the Sm can be included in the Ln component, which can be transitioned to another element having a smaller ionic radius (e.g., to the right along the periodic table, such as Gd) to lead to a higher CTE. The composition change can be a partial change (e.g., Ln includes Gd, changes to include both Sm and Gd with an increasing concentration of Gd relative to Sm as the distance away from the underlying layer increases) across the thickness or complete change (e.g., changing from the starting component to a second, different component, such as changing from Sm, to both Sm and Gd, to Gd as the distance away from the underlying layer increases).

The A component can also be compositionally different (e.g., graded) at particular thicknesses within the abradable coating 202. For example, the Si can be included in the A component, which can be transitioned to another element having a larger ionic radius (e.g., to Gm to Ti, etc.) to lead to a higher CTE. The composition change can be a partial change across the thickness or complete change.

The B component can also be compositionally different (e.g., graded) at particular thicknesses within the abradable coating 202. For example, W can be included in the B component, which can be transitioned to another element having a larger ionic radius (e.g., to Mo) to decrease CTE and to increase abradability. The composition change can be a partial change across the thickness or complete change.

Figure 7:
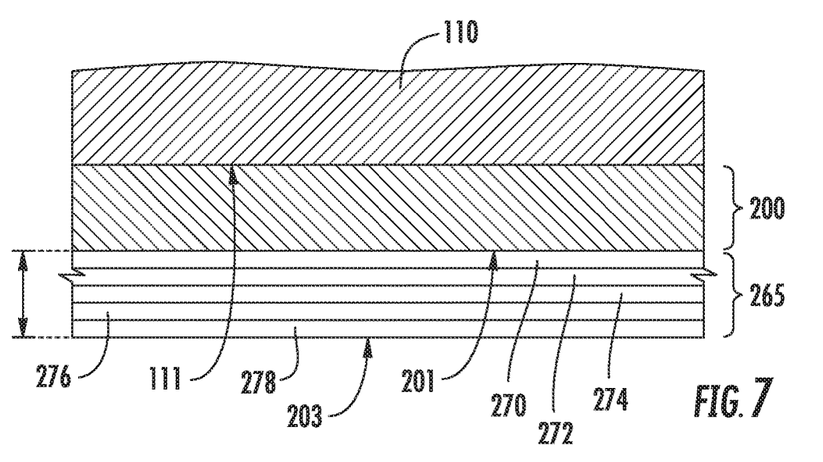
FIG. 7 is a schematic cross sectional view of another exemplary coated substrate in accordance with one embodiment disclosed herein.
Figure 8:
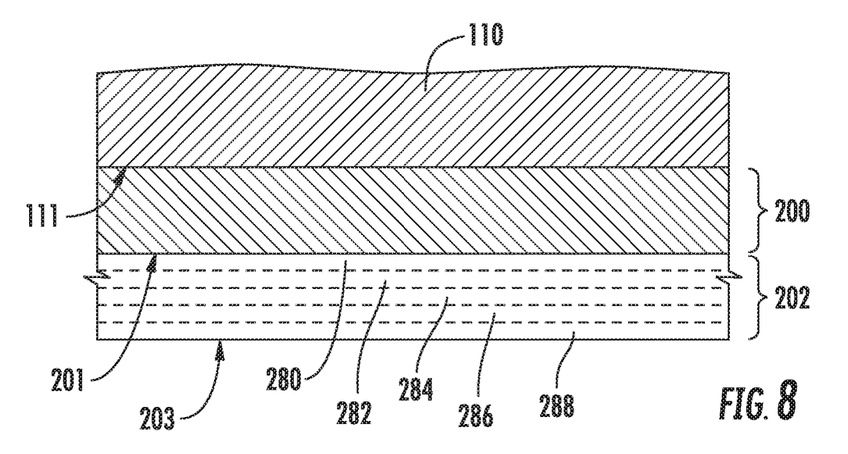
FIG. 8 is a schematic cross sectional view of yet another exemplary coated substrate in accordance with one embodiment disclosed herein.

Referring to FIG. 7, a compositional gradient can be formed by depositing a plurality 265 of layers 270, 272, 274, 276, 278 on the surface 201 of the EBC 200, such as via spray deposition, slurry deposition, additive manufacturing, etc. Each layer can be formed, in certain embodiments, with a different composition and/or porosity. In one embodiment, for example, at least one of Ln, A, and/or B changes for each of the layers 265. For example, the plurality 265 of layers can include a stepped compositional change between adjacent layers 270, 272, 274, 276, 278 to result in a graded abradable coating 202 upon heat treatment, as shown in FIG. 8. The resulting graded abradable coating 202 can have a linear change (i.e., a substantially constant rate of change) through the thickness of the graded abradable coating 202. Alternatively, the compositional change may be varied throughout the graded abradable coating 202, for example the first half of the thickness may have on particular rate of change while the second half of the thickness may have a second rate of change. For example, the rate of compositional change may be relatively fast through the first half of the thickness, while the rate of compositional change is relatively slow through the second half of the thickness.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coating system on a surface of a CMC component, comprising:
    an environmental barrier coating on the surface of the CMC component; and
    an abradable coating on the environmental barrier coating and defining an external surface opposite of the environmental barrier coating, wherein the abradable coating comprises a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, or a combination thereof; and B comprises Mo, W, or a combination thereof, and wherein the abradable coating has a first coefficient of thermal expansion at an interface with the environmental barrier coating that changes to a second coefficient of thermal expansion at its external surface, and further wherein at least one of a Ln composition of the compound and a A composition of the compound changes over a gradient from the environmental barrier coating to the external surface.

2. The coating system as in claim 1, wherein the abradable coating has a coefficient of thermal expansion that changes over a gradient from the environmental barrier coating to the external surface.

3. The coating system as in claim 1, wherein the Ln composition of the compound changes over a gradient from the environmental barrier coating to the external surface.

4. The coating system as in claim 1, wherein the A composition of the compound changes over a gradient from the environmental barrier coating to the external surface.

5. The coating system as in claim 1, wherein the abradable coating has a porosity that changes over a gradient from the environmental barrier coating to the external surface.

6. The coating system as in claim 1, wherein the compound has the formula: $Ln_2AMo_xW_{1-x}O_8$, where $0 \leq x \leq$ about 0.5.

7. The coating system as in claim 6, wherein $0 < x \leq$ about 0.5.

8. The coating system as in claim 1, wherein the compound has the formula: $Ln_2Si_yA_{1-y}Mo_xW_{1-x}O_8$, where $0 \leq x \leq$ about 0.5; $0 < y \leq$ about 0.5; and A is Ti, Ge, or a combination thereof.

9. The coating system as in claim 1, wherein Ln comprises yttrium.

10. The coating system as in claim 1, wherein the compound has the formula: $Y_2SiMo_xW_{1-x}O_8$ where x is 0 to about 0.5, $Sm_2SiMo_xW_{1-x}O_8$ where x is 0 to about 0.5, $Gd_2SiMO_xW_{1-x}O_8$ where x is 0 to about 0.5, or a combination thereof.

11. The coating system as in claim 1, wherein the compound forms a zircon crystal structure in the abradable coating or a scheelite structure in the abradable coating.

12. The coating system as in claim 1, wherein the abradable coating has a porosity that is less than about 15% porosity.

13. The coating system as in claim 1, wherein the abradable coating comprises a discontinuous, secondary phase defined within a matrix material, and wherein the compound having the formula: $Ln_2ABO_8$ forms the secondary phase.

14. A coating system on a hot gas path surface of a CMC shroud in a gas turbine engine, the coating system comprising:
    an environmental barrier coating on the hot gas path surface of the CMC shroud; and
    an abradable coating on the environmental barrier coating, wherein the abradable coating comprises a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, or a combination thereof; and B comprises Mo, W, or a combination thereof, and further wherein at least one of a Ln composition of the compound and a A composition of the compound changes over a gradient from the environmental barrier coating to the external surface.

15. The coating system as in claim 14, wherein the abradable coating is a continuous coating covering all of the environmental barrier coating on the hot gas path surface of the CMC shroud.

16. The coating system as in claim 14, wherein the abradable coating comprises a discontinuous, secondary phase defined within a matrix material, and wherein the compound having the formula: $Ln_2ABO_8$ forms the secondary phase.

17. The coating system as in claim 16, wherein the matrix material comprises a rare earth disilicate, a rare earth monosilicate, or a combination thereof.

18. The coating system as in claim 14, wherein the abradable coating has a coefficient of thermal expansion that changes over a gradient from the environmental barrier coating to the external surface.

19. A method of applying an abradable coating onto a CMC component of a gas turbine engine, the method comprising:
   applying an abradable coating on an environmental barrier coating of a hot gas path surface of the CMC component, wherein the abradable coating comprises a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, or a combination thereof; and B comprises Mo, W, or a combination thereof, wherein at least one of a Ln composition of the compound and a A composition of the compound changes within the abradable coating over a gradient from the environmental barrier coating to the external surface.

20. The method as in claim 19, wherein the abradable coating has a coefficient of thermal expansion that changes over a gradient from the environmental barrier coating to the external surface.

* * * * *